(12) United States Patent
Wang et al.

(10) Patent No.: US 9,369,556 B1
(45) Date of Patent: Jun. 14, 2016

(54) PORTABLE ELECTRONIC DEVICE AND PROTECTION METHOD THEREOF

(71) Applicant: HTC Corporation, Taoyuan (TW)

(72) Inventors: Kuei-Cheng Wang, Taoyuan (TW); Chia-Hung Lin, Taoyuan (TW); Ming-Fu Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/722,126

(22) Filed: May 26, 2015

(51) Int. Cl.
*H04M 1/00* (2006.01)
*H04M 1/18* (2006.01)
*H04B 1/3888* (2015.01)
*H04M 1/725* (2006.01)

(52) U.S. Cl.
CPC ............... *H04M 1/18* (2013.01); *H04B 1/3888* (2013.01); *H04M 1/7258* (2013.01); *H04M 1/72569* (2013.01); *H04M 1/72577* (2013.01)

(58) Field of Classification Search
USPC ....................................................... 455/550.1
See application file for complete search history.

(56) References Cited

U.S. PATENT DOCUMENTS

| | | | | |
|---|---|---|---|---|
| 5,196,729 | A * | 3/1993 | Thorngren | F25D 21/02 307/118 |
| 7,365,281 | B2 | 4/2008 | Yamaguchi et al. | |
| 8,803,686 | B2 * | 8/2014 | Yoshida | H05B 33/0815 340/545.2 |
| 2005/0079888 | A1 * | 4/2005 | Menz | H04M 1/18 455/550.1 |
| 2009/0193859 | A1 | 8/2009 | Kwon et al. | |
| 2009/0195394 | A1 * | 8/2009 | Johnson | G06F 21/554 340/604 |
| 2012/0194345 | A1 * | 8/2012 | Ueda | H04M 1/18 340/604 |
| 2013/0293385 | A1 * | 11/2013 | Yoshida | H05B 33/0815 340/686.1 |
| 2014/0191874 | A1 * | 7/2014 | Stevens | H03K 17/94 340/604 |
| 2014/0260550 | A1 | 9/2014 | Kil et al. | |
| 2014/0313039 | A1 * | 10/2014 | Stevens | H03K 17/94 340/604 |
| 2015/0277720 | A1 * | 10/2015 | Thorson | G06F 3/04847 345/174 |
| 2016/0019773 | A1 * | 1/2016 | Stevens | H03K 17/94 340/604 |

* cited by examiner

*Primary Examiner* — Fayyaz Alam
(74) *Attorney, Agent, or Firm* — Jianq Chyun IP Office

(57) ABSTRACT

A portable electronic device including a housing, a button assembly, a locking unit, a processing unit and a sensing unit is provided. The button assembly is disposed at an opening of the housing and includes a button, an elastomer and a switch. The button is movably disposed at the opening and configured to trigger the switch when an external force is applied. The elastomer is disposed between the button and the housing and forms a waterproof seal between the button and the housing. The locking unit is enabled to keep the button on a fixed position against the elastomer when the processing unit determines that a detection signal generated by the sensing unit is over a threshold. The locking unit is disabled when the processing unit determines that the detection signal is not over the threshold. A protection method for a portable electronic device is also provided.

15 Claims, 2 Drawing Sheets

PORTABLE ELECTRONIC DEVICE AND PROTECTION METHOD THEREOF

BACKGROUND OF THE APPLICATION

1. Field of the Application

The present application generally relates to a portable electronic device and a protection method thereof, and particularly, to a portable electronic device with waterproof protection and a protection method thereof.

2. Description of Related Art

Recently, with advancement of electronic technologies, portable electronic devices including mobile phones, tablet computers, personal digital assistants (PDAs) and smart phones, etc., have been widely adopted. The main difference between the portable electronic devices and other non-portable types of electronic devices is that portable electronic devices are aimed for portability.

However, the portable electronic devices may frequently encounter water hazards as a result of their portability since device users tends to carry and use the portable electronic devices wherever they travel. Consequently, more and more portable electronic devices on the market have been provided with waterproof protections, such as sealing the ports (i.e., charging port, headphone port and Micro USB port) with a flap door, adding waterproof rubber rings between the device housing and the buttons, coating the display screen and the device housing with waterproof nano-coatings, etc. Nevertheless, having the waterproof protections does not indicate that the portable electronic devices are operable under water.

Taking the waterproof rubber ring for an instance, when a portable electronic device is dropped and immersed in water, the waterproof rubber ring as being disposed between the device housing and the button is able to prevent water from entering the interior of the portable electronic device through the gap between the device housing and the button; however, if the device user intends to press the button to execute an operation, then the waterproof rubber ring surrounding the button would be deformed due to the downward movement of the button, thereby providing a possibility for the water to leak into the interior of the portable electronic device and damage the internal components. Therefore, how to increase the waterproof protection of the portable electronic device under the water has become a relevant topic for those skilled in the art of the related field.

SUMMARY OF THE APPLICATION

Accordingly, the present application is directed to a portable electronic device with improved waterproof protection without altering the device appearance.

Further, the present application is also directed to a protection method for a portable electronic device when there is the presence of water around the portable electronic device.

The portable electronic device of the present application includes a housing, a button assembly, a locking unit, a processing unit and a sensing unit. The housing has an opening. The button assembly is disposed at the opening and includes a button, an elastomer and a switch. The button is movably disposed at the opening, and the elastomer is disposed between the button and the housing and forms a waterproof seal between the button and the housing. The switch is located underneath the button, wherein the button is configured to trigger the switch for changing functions of the portable electronic device when an external force is applied. The locking unit is configured to keep the button on a fixed position against the elastomer. The processing unit is disposed within the housing and electrically coupled to the switch and the locking unit. The sensing unit is disposed within the housing and electrically coupled to the processing unit, and the sensing unit is configured to sense the presence of water around the portable electronic device and generate a detection signal accordingly. When the processing unit determines that the sensed detection signal is over a threshold, the processing unit enables the locking unit to keep the button on the fixed position against the elastomer. When the processing unit determines that the sensed detection signal is not over the threshold, the processing unit disables the locking unit.

The protection method for the portable electronic device of the present application includes the following steps: sensing the presence of water around the portable electronic device and generating a detection signal; enabling the locking unit to keep the button on a fixed position against the elastomer by the processing unit, when the processing unit determines that the sensed detection signal is over a threshold; and disabling the locking unit by the processing unit, when the processing unit determines that the sensed detection signal is not over the threshold, wherein the button is configured to trigger the switch when the locking unit is disable and an external force is applied.

According to an embodiment of the present application, the button assembly further comprises a circuit board connected with the switch such that the switch is disposed on a top surface of the circuit board.

According to an embodiment of the present application, the locking unit includes an engaging member movably disposed beside the button and a driving source electrically coupled to the processing unit, and when the locking unit is enabled, the driving source drives the engaging member into an engagement with the button, so as to keep the button on the fixed position against the elastomer when the external force is applied.

According to an embodiment of the present application, the driving source includes an electromagnetic driving source or a piezoelectric driving source.

According to an embodiment of the present application, the sensing unit includes a touch sensor, a barometer, a pressure sensor, a proximity sensor, a contact sensor, a camera sensor, or a light sensor.

According to an embodiment of the present application, the sensing unit includes a combination of at least two different sensors.

According to an embodiment of the present application, the at least two different sensors each generates a detection signal to the processing unit when detecting a change in the environmental condition of the portable electronic device, and the processing unit determines whether the portable electronic device is in the state of being immersed in water according to both of the sensed detection signals from the at least two different sensors.

Based on the description above, the present application provides the portable electronic device and the protection method thereof, wherein a waterproof seal is formed between the button and the housing by the elastomer disposed between the button and the housing, so as to prevent water from entering the interior of the portable electronic device. The locking unit keeps the button on the fixed position against the elastomer when the processing unit determines that the sensed detection signal is over the threshold, so that a user is unable to press the button and break the waterproof seal between the housing and the button by deforming the elastomer, thereby providing the portable electronic device with improved waterproof protection without altering the device appearance.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
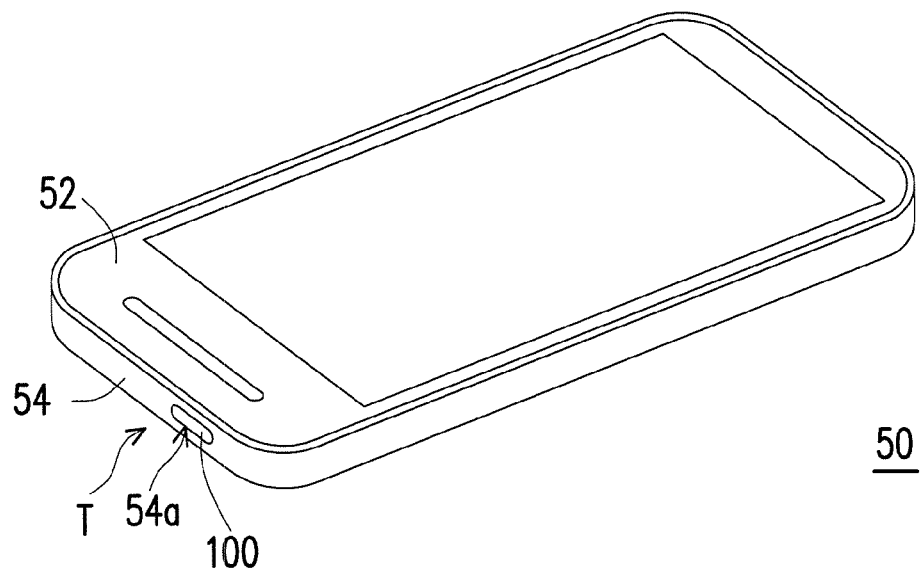
FIG. 1 is a schematic view illustrating a portable electronic device according to an embodiment of the application.

FIG. 1 is a schematic view illustrating a portable electronic device according to an embodiment of the application. Referring to FIG. 1, in the present embodiment, the portable electronic device 50 includes a body 52, a housing 54 and a button assembly 100. The housing 54 covers the body 52 and has an opening 54a, and the button assembly 100 is suitable for being disposed at the opening 54a. The portable electronic device 50 is, for example, a mobile phone, a personal digital assistant (PDA) or a smart phone, the housing 54 is, for example, a casing of the mobile phone, the PDA or the smart phone, and the opening 54 is, for example, located at a top portion T of the housing 54, but the application does not limit the type of the portable electronic device 50, and neither does the application limit the location of the opening 54 on the housing 54.

Figure 2:
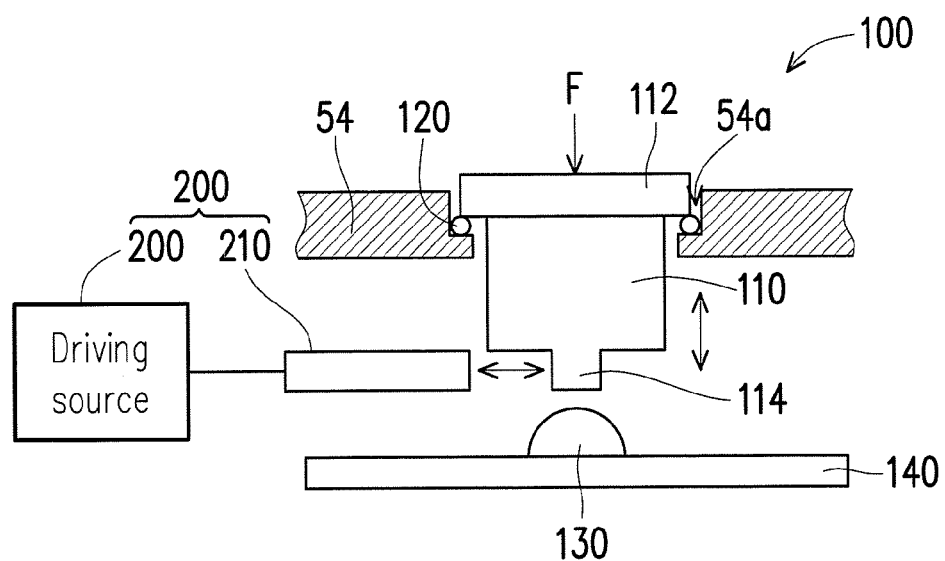
FIG. 2 is a partially enlarged cross-sectional view illustrating the portable electronic device in FIG. 1.
Figure 3:
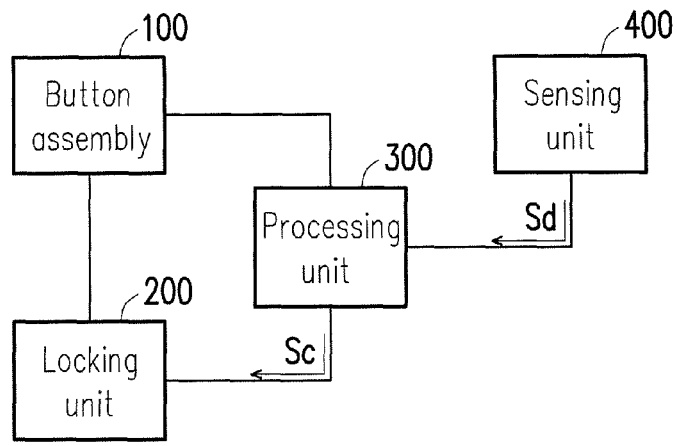
FIG. 3 is a diagram illustrating the waterproof protection structural system of the portable electronic in FIG. 2.

FIG. 2 is a partially enlarged cross-sectional view illustrating the portable electronic device in FIG. 1. FIG. 3 is a diagram illustrating the waterproof protection structural system of the portable electronic device in FIG. 2. Referring to FIG. 2, in the present embodiment, the button assembly 100 includes a button 110, an elastomer 120, a switch 130 and a circuit board 140. The button 110 is movably disposed at the opening 54a and has a pressing portion 112 exposed by the housing 54. The button 110 may, for example, be a power key button. The elastomer 120 is disposed between the button 110 and the housing 54, and preferably, located underneath the pressing portion 112 and surrounding the button 110. The elastomer 120 is deformable, so that the button 110 is able to move downwardly when a user presses the pressing portion 112 exposed by the housing 54 and then return back to an initial position (i.e., a position when the pressing portion 112 is not being pressed) when the user stops the pressing. The elastomer 120 can form a waterproof seal between the button 110 and the housing 54, and preferably, between the pressing portion 112 of the button 110 and the housing 54, so that water is unable to enter the interior of the portable electronic device 50 from a gap between the button 110 and the housing 54 when the button 110 is not being pressed. The elastomer may be rubber, amorphous polymers, dielectric elastomers, or thermoplastic elastomers. Voltage, current, heat or energy may be applied to the elastomer to change the shape, stiffness or resistance to deformation of the elastomer.

The switch 130 is located underneath the button 110 and connected with the circuit board 140. More specifically, the switch 130 is disposed on a top surface of the circuit board 140, wherein the top surface of the circuit board 140 faces towards the button 110, and the location of the switch 130 on the top surface of the circuit board 140 is corresponded to the location of the button 110. The circuit board 140 is, for example, a printed circuit board (PCB) or a flexible printed circuit (FPC) board, and the switch 130 is, for example, a power key switch, but the application is not limited thereto. The switch 130 is configured to be electrically coupled to the button 110 when being contacted by the button 110, such that the switch 130 is adapted to be triggered by pressing the button 110.

In the present embodiment, the button 100 further has a protruding portion 114 located opposite to the pressing portion 112 and corresponding to the switch 130. The protruding portion 114 is configured to come in contact with the switch 130 and press against the switch 130 when the user applies an external force F to the button 110 by pressing the pressing portion 112 exposed by the housing 54, so as to trigger the switch 130. In other words, the button 110 is configured to trigger the switch 130 for changing functions of the portable electronic device 50 when the external force F is applied. In addition, the circuit board 140 is connected to the body 52, such that the circuit board 140 and the switch 130 disposed thereon are electrically connected to the body 52. Thus, when the switch 130 is triggered by the button 110, the body 52 of the portable electronic device 50 may execute the corresponding operations.

Referring to FIG. 2 and FIG. 3 at the same time, the portable electronic device 50 of the present embodiment further includes a locking unit 200, a processing unit 300, and a sensing unit 400. The locking unit 200 is disposed within the housing 54 and located beside the button 110, wherein the locking unit 200 is configured to keep the button 110 on a fixed position against the elastomer 120 (i.e., a position when the button 100 is not being pressed by a user) and prevent the button from triggering the switch 130 when the locking unit 200 is enabled. More specifically, in the present embodiment, the locking unit 200 can include an engaging member 210 and a driving source 220, wherein the engaging member 210 is movably disposed beside the protruding portion 114 of the button 110, and the driving source 220 is electrically coupled to the processing unit 300. When the locking unit 200 is enabled, the driving source 220 can drive the engaging member 210 into an engagement with the protruding portion 114, so as to keep the button 110 on the fixed position against the elastomer 120 and prevent the button from being pressed towards the switch 130 due to the external force F. In other words, the engaging member 210 of the locking unit 200 is adapted to form an engagement with the protruding portion 114 of the button 110 the when locking unit 200 is enabled, thereby preventing the elastomer 120 located in the opening and surrounding the button 110 from being deformed due to a downward movement of the button 110. The driving source 220 may, for example, be an electromagnetic driving source or a piezoelectric driving source, but the application is not limited thereto. Other suitable driving source, such as a motor, capable of driving the engaging member 220 into an engagement with the protruding portion 114 of the button 110 may also be adopted.

In the present embodiment, the processing unit 300 is disposed within the housing 54 and electrically coupled to the button assembly 100 and the locking unit 200. In more specific, the processing unit 300 is electrically coupled to the switch 130 of the button assembly 100 and the driving source 220 of the locking unit 200, so as to control the operations corresponding to the switch 130 and the execution of the locking unit 200. The processing unit 200 may, for example, be disposed on the circuit board 140 or other circuit in the body 52 of the portable electronic device 50. The sensing unit 400 is also disposed within the housing 54 and electrically coupled to the processing unit 300. The sensing unit 400 is configured to sense an environmental condition of the portable electronic device 50, such as to sense the presence of water around the portable electronic device 50. When the sensing unit 400 senses that there is a change in environmental condition of the portable electronic device 50, such that there is the presence of water on or around the portable electronic device 50, or the portable electronic device 50 is under water, the sensing unit 400 generates a detection signal Sd accordingly, and the sensing unit 400 sends the sensed detection signal Sd to the processing unit 300 to inform about the change. Upon receiving the sensed detection signal Sd, the processing unit 300 determines whether the sensed detection signal Sd is over a threshold, wherein when the processing unit 300 determines that the sensed detection signal Sd is over the threshold (namely, the portable electronic device 50 is substantially in a state of being immersed in water), the processing unit 300 generates and sends a control signal Sc to the locking unit 200 so as to enable the locking unit 200 to keep the button 110 on the fixed position against the elastomer 120; and when the processing unit 300 determines that the sensed detection signal Sd is not over the threshold (namely, the portable electronic device 50 is not substantially in a state of being immersed in water), the processing unit 300 still generates and sends the control signal Sc to the locking unit 200 so as to disable the locking unit 200 or to ensure that the locking unit 200 is disabled. The locking unit 200 may be a microelectromechanical systems (MEMS) switch, MEMS actuator, dielectric elastomers, or thermoplastic elastomers. Voltage, current, heat or energy may be applied to the elastomer to change the shape, stiffness or resistance to deformation of the locking unit 200. The processing unit may transmit or generate current or voltage to the locking unit (elastomer such as dielectric elastomers, or thermoplastic elastomers.) and change the shape of the locking unit to keep the button 110 on the fixed position against the elastomer 120. The locking unit maybe a MEMS actuator, such as comb drive, electrostatic, thermal, piezoelectric or magnetic actuator, that is controlled by the processing unit. The processing unit may transmit or generate current or voltage to the locking unit (MEMS actuator) and drive the locking unit to push against the button or lock in position so that the button cannot move to another position so the button 110 is in a fixed position against the elastomer 120.

Figure 4:
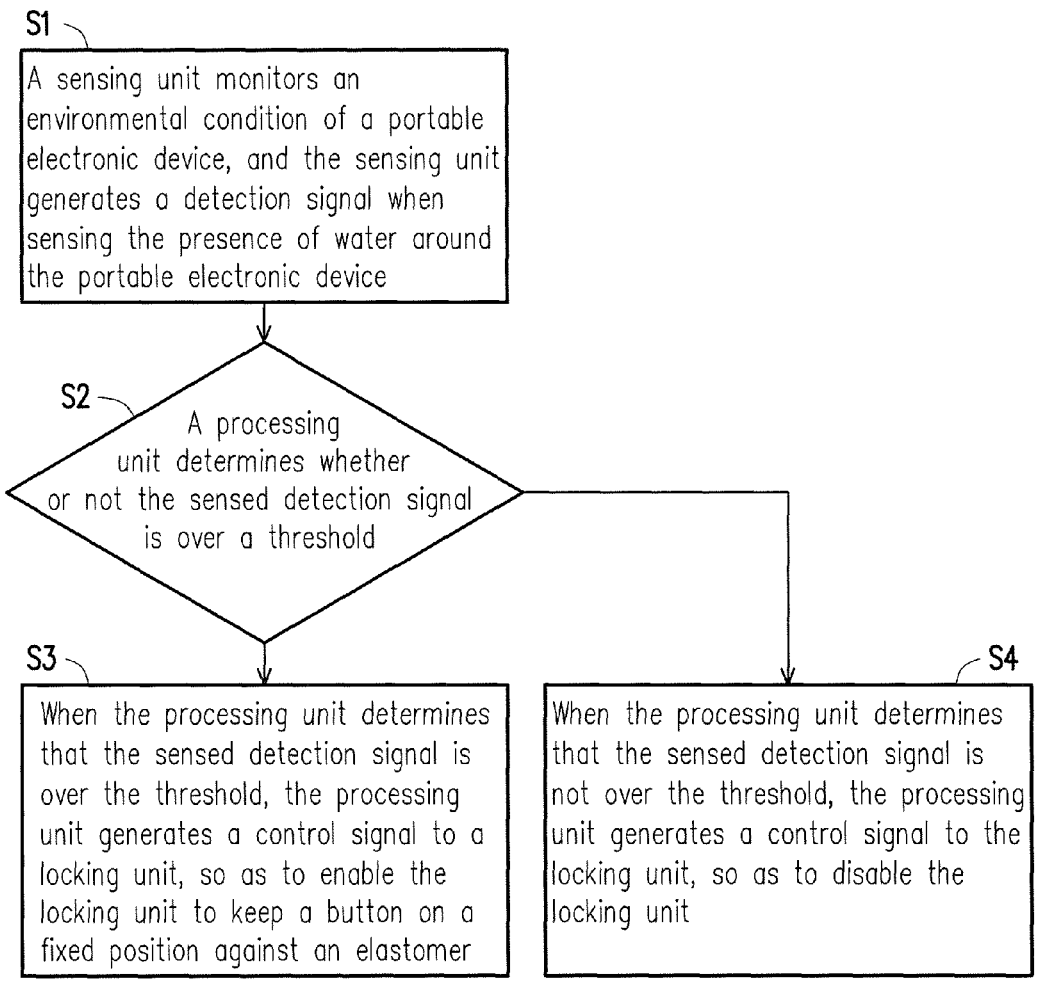
FIG. 4 is a flow chart diagram illustrating a protection method for a portable electronic device according to an embodiment of the application.

FIG. 4 is a flow chart diagram illustrating a protection method for a portable electronic device according to an embodiment of the application. The portable electronic device in the present embodiment can be the portable electronic device 50 depicted in FIG. 1 and FIG. 2. Next, referring to FIG. 4, in step S1, the sensing unit 400 monitors the environmental condition of the portable electronic device 50, and the sensing unit 400 generates a detection signal Sd when sensing the presence of water around the portable electronic device 50; and, in step S2, the processing unit 300 determines whether or not the sensed detection signal Sd is over a threshold, so as to determine whether or not the portable electronic device 50 is in a state of being immersed in water. Next, in step S3, when the processing unit 300 determines that the sensed detection signal Sd is over the threshold (namely, the portable electronic device 50 is substantially in the state of being immersed in water), the processing unit 300 generates and sends a control signal Sc to the locking unit 200, so as to enable the locking unit 200 to keep the button 110 on a fixed position against the elastomer 120; and in step S4, when the processing unit 300 determines that the sensed detection signal Sd is not over the threshold (namely, the portable electronic device 50 is not substantially in the state of being immersed in water), the processing unit 300 generates and sends a control signal Sc to the locking unit 200, so as to disable the locking unit 200, wherein the button 110 is configured to trigger the switch 130 when the locking unit 200 is disabled and an external force F is applied.

In the present embodiment, the sensing unit 400 may, for example, include a touch sensor, a barometer, a pressure sensor, a proximity sensor, a contact sensor, a camera sensor, or a light sensor. For an example, if the sensing unit 400 is a touch sensor, then the detection signal Sd may include a surface detection information, and the processing unit 300 may determine that the portable electronic device 50 is in the state of being immersed in water when the surface detection information indicates that the entire surface of a display screen of the portable electronic device 50 is being evenly touched or all the external surfaces of the housing 54 are subjected to a uniform force (such as in a condition of being surrounded by water). For another example, if the sensing unit 400 is a barometer or pressure sensor, then the detection signal Sd may include a pressure information, and the processing unit 300 may determine that the portable electronic device 50 is in the state of being immersed in water when the pressure information indicates that a water level around the portable electronic device 50 or a force exerted on the portable electronic device 50 exceeds a threshold. For a further example, if the sensing unit 400 is a camera sensor, then the detection signal Sd may include at least one image taken by a camera installed on the portable electronic device 50 which shows that the environmental condition of the portable electronic device 50 matches a underwater condition, and thus the processing unit 300 would generate and send a control signal Sc to enable the locking unit 200. The three examples described in the above are merely provided for demonstrating, in some cases, how the sensing unit 400 may detect a change in the environmental condition of the portable electronic device 50 and on what basis the processing unit can determine that the portable electronic device 50 is in the state of immersed in water, but the application is not limited thereto. In other words, the application does not intend to limit on how the sensing unit 400 carry out its sensing functions and how the processing unit determines whether the portable electronic device 50 is in the state of immersed in water as long as an accurate determination result may be obtained.

In addition, the sensing unit 400 may further include a combination of at least two different sensors that are mentioned in the above, such as the touch sensor, the barometer, the proximity sensor, the contact sensor, the pressure sensor, the camera sensor, and the light sensor. The at least two different sensors may each generates a detection signal Sd to the processing unit 300 when detecting there is a change in the environmental condition of the portable electronic device 50, so that the processing unit 300 may determine whether the portable electronic device 50 is in the state of being immersed in water according to both of the sensed detection signals Sd from the at least two different sensors.

In sum, the present application provides a portable electronic device with improved waterproof protection and a protection method thereof, wherein the button is movably disposed at the opening of the housing, and the elastomer disposed in the opening and surrounds the button so as to form a waterproof seal between the button and the housing. The elastomer is able to prevent the water from entering the interior of the portable electronic device. However, if the user intends to trigger the switch for changing the function of the portable electronic device by pressing down the button when the portable electronic device is in a state of being immersed in water, then the elastomer might be deformed due to the downward movement of the button, thereby creating a possibility for the water to leak into the interior of the portable electronic device through the gap between the button and the housing. Therefore, in the present application, when the sensing unit senses the presence of water around the portable electronic device and when the processing unit determines that the sensed detection signal is over a threshold (which indicates that the portable electronic device is substantially in the state of being immersed in water), the locking unit is configured to keep the button on the fixed position against the elastomer, so that the user is unable to press down the button and break the waterproof seal between the housing and the button by deforming the elastomer, thereby providing the portable electronic device with improved waterproof protection without altering the device appearance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
   a housing, having an opening;
   a button assembly, disposed at the opening and comprising a button, an elastomer and a switch, wherein the button is movably disposed at the opening, the elastomer is disposed between the button and the housing and forms a waterproof seal between the button and the housing, and the switch is located underneath the button, wherein the button is configured to trigger the switch for changing functions of the portable electronic device when an external force is applied;
   a locking unit, configured to keep the button on a fixed position against the elastomer;
   a processing unit, disposed within the housing and electrically coupled to the switch and the locking unit; and
   a sensing unit, disposed on the housing and electrically coupled to the processing unit, the sensing unit being configured to sense the presence of water around the portable electronic device and generate a detection signal accordingly, wherein when the processing unit determines that the sensed detection signal is over a threshold, the processing unit enables the locking unit to keep the button on the fixed position against the elastomer, and when the processing unit determines that the sensed detection signal is not over the threshold, the processing unit disables the locking unit.

2. The portable electronic device as recited in claim 1, wherein the button assembly further comprises a circuit board connected with the switch such that the switch is disposed on a top surface of the circuit board.

3. The portable electronic device as recited in claim 1, wherein the locking unit comprises an engaging member movably disposed beside the button and a driving source electrically coupled to the processing unit, and when the locking unit is enabled, the driving source drives the engaging member into an engagement with the button, so as to keep the button on the fixed position against the elastomer when the external force is applied.

4. The portable electronic device as recited in claim 3, wherein the driving source comprises an electromagnetic driving source or a piezoelectric driving source.

5. The portable electronic device as recited in claim 1, wherein the sensing unit comprises a touch sensor, a barometer, a pressure sensor, a proximity sensor, a contact sensor, a camera sensor, or a light sensor.

6. The portable electronic device as recited in claim 1, wherein the sensing unit comprises a combination of at least two different sensors.

7. The portable electronic device as recited in claim 6, wherein the at least two different sensors each generates a detection signal to the processing unit when detecting a change in the environmental condition of the portable electronic device, and the processing unit determines whether the portable electronic device is in the state of being immersed in water according to both the sensed detection signals from the at least two different sensors.

8. The portable electronic device as recited in claim 1, wherein the button has a pressing portion exposed by the housing, and the elastomer is disposed in the opening and underneath the pressing portion so as to forms a waterproof seal between the pressing portion and the housing.

9. The portable electronic device as recited in claim 8, wherein the button further has a protruding portion located opposite to the pressing portion, and the protruding portion is configured to press against the switch when the button moves towards switch, so as to trigger the switch.

10. A protection method for a portable electronic device, the portable electronic device having a housing, a button assembly, a locking unit, a processing unit, and a sensing unit, the button assembly comprising a button, an elastomer and a switch, the elastomer forming a waterproof seal between the button and the housing, the method comprising:
    sensing the presence of water around the portable electronic device and generating a detection signal;
    enabling the locking unit to keep the button on a fixed position against the elastomer by the processing unit, when the processing unit determines that the sensed detection signal is over a threshold; and
    disabling the locking unit by the processing unit, when the processing unit determines that the sensed detection signal is not over the threshold, wherein the button is configured to trigger the switch when the locking unit is disabled and an external force is applied.

11. The protection method as recited in claim 10, wherein the locking unit comprises an engaging member movably disposed beside the button and a driving source electrically coupled to the processing unit, and when the locking unit is enabled, the driving source drives the engaging member into an engagement with the button, so as to keep the button on the fixed position against the elastomer when the external force is applied.

12. The protection method as recited in claim 11, wherein the driving source comprises an electromagnetic driving source or a piezoelectric driving source.

13. The protection method as recited in claim 10, wherein the sensing unit comprises a touch sensor, a barometer, a pressure sensor, a proximity sensor, a contact sensor, a camera sensor, or a light sensor.

14. The protection method as recited in claim 10, wherein the sensing unit comprises a combination of at least two different sensors.

15. The protection method as recited in claim 14, wherein the at least two different sensors each generates a detection signal to the processing unit when detecting a change in the environmental condition of the portable electronic device, and the processing unit determines whether the portable electronic device is in the state of being immersed in water according to both of the sensed detection signals from the at least two different sensors.

* * * * *